United States Patent
Sczeburek et al.

(10) Patent No.: US 6,702,319 B2
(45) Date of Patent: Mar. 9, 2004

(54) AIRBAG MODULE WITH LATCHING CONNECTION

(75) Inventors: Frank Sczeburek, Langenselbold (DE); Burghard Stich, Bingen (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 97 days.

(21) Appl. No.: 10/125,505

(22) Filed: Apr. 19, 2002

(65) Prior Publication Data

US 2003/0038460 A1 Feb. 27, 2003

(30) Foreign Application Priority Data

Aug. 21, 2001 (DE) ..................... 201 13 806 U

(51) Int. Cl.⁷ ............................. B60R 21/16
(52) U.S. Cl. ................ 280/728.3; 280/728.2; 280/731
(58) Field of Search .............. 280/728.2, 731, 280/728.3, 732, 730.2, 730.1

(56) References Cited

U.S. PATENT DOCUMENTS

| | | | | |
|---|---|---|---|---|
| 5,201,541 A | * | 4/1993 | Jones et al. .............. 280/731 |
| 5,280,946 A | * | 1/1994 | Adams et al. ............ 280/728.2 |
| 5,297,813 A | * | 3/1994 | Baba et al. .............. 280/728.3 |
| 5,312,129 A | * | 5/1994 | Ogawa ..................... 280/728.2 |
| 5,445,409 A | * | 8/1995 | Abramczyk et al. ..... 280/728.2 |
| 5,460,400 A | | 10/1995 | Davidson ................. 280/728.2 |
| 5,580,082 A | | 12/1996 | Shiga et al. .............. 280/728.3 |
| 5,588,669 A | | 12/1996 | Leonard et al. .......... 280/728.3 |
| 5,658,008 A | * | 8/1997 | Herrmann et al. ....... 280/728.2 |
| 5,791,682 A | | 8/1998 | Hiramitsu et al. ....... 280/728.2 |
| 5,816,608 A | | 10/1998 | Tanabe .................... 280/728.2 |
| 5,829,777 A | * | 11/1998 | Sakurai et al. ........... 280/728.2 |
| 5,851,023 A | * | 12/1998 | Nagata et al. ............ 280/728.3 |
| 6,092,834 A | * | 7/2000 | Staub et al. .............. 280/728.2 |
| 6,186,535 B1 | * | 2/2001 | Sugiyama et al. ....... 280/728.2 |
| 6,199,899 B1 | * | 3/2001 | Krebs et al. .............. 280/731 |
| 6,325,407 B1 | * | 12/2001 | Soderquist ............... 280/728.2 |
| 6,419,261 B1 | * | 7/2002 | Ibe .......................... 280/728.2 |
| 6,547,272 B1 | * | 4/2003 | Klozik et al. ............ 280/728.2 |

* cited by examiner

*Primary Examiner*—Brian L. Johnson
*Assistant Examiner*—Han Phan
(74) *Attorney, Agent, or Firm*—Lonnie Drayer; Jarett Rieger

(57) ABSTRACT

An airbag module has at least two housing parts securely connected to each other by a mechanical catch connection. At least one catch hook is arranged on the first housing part and at least one tab with a corresponding catch opening is arranged in the second housing part. During the latching together of the two housing parts, the catch hook engages the corresponding catch opening. At least one ramp is arranged on the first housing part, opposite the catch hook, which ramp rises in the insertion direction of the second housing. The ramp rises in the direction in which the second housing part is moved toward the first housing part during assembly. During the assembly of the first housing part with the second housing part, the tab of the second housing part comes into contact with the ramp during the latching and is deflected by the ramp in the direction of the catch hook. The deflection of the tab results in the catch opening being deflected or pushed in the direction of the catch hook. The catch hook fully engages the catch opening with the greatest possible contact surface between catch hook and catch opening. Because of the ramp, during the latching a maximal contact surface is always achieved between catch opening and catch hook, it can be ensured that during the deployment of the airbag the ensuing forces are distributed on as large a surface as possible.

16 Claims, 4 Drawing Sheets

US 6,702,319 B2

AIRBAG MODULE WITH LATCHING CONNECTION

FIELD OF THE INVENTION

The present invention relates to an airbag module comprising at least two housing parts.

BACKGROUND OF THE INVENTION

Airbag modules, in particular driver side airbag modules, typically comprise two housing parts for receiving the airbag. One housing part is the actual airbag housing, which is secured to for instance a steering wheel of a motor vehicle. The second housing part typically is an airbag cover, which covers the airbag module to the outside, i.e. towards the vehicle interior. For the purpose of easy assembly, these two housing parts are preferably latched together during the assembly.

It is problematic, however, that during the activation of the airbag module, extremely high forces operate on the airbag cover. Despite these high forces it must be ensured that the airbag cover is not detached from the airbag housing. The airbag cover should open only at the set breaking points to enable an ejection of the airbag. The known catch connections comprising a catch nose and a corresponding catch opening, in which the catch nose engages, have often been unsatisfactory in this respect, since during the deployment of the airbag the catch noses were torn off due to the high forces that arise during deployment of the airbag.

SUMMARY OF THE INVENTION

There is provided in accordance with the present invention an airbag module comprising at least two housing parts securely connected to each other by a mechanical catch connection. At least one catch hook is arranged on the first housing part and at least one tab with a corresponding catch opening that is arranged in the second housing part. During the latching together of the two housing parts, the catch hook engages the corresponding catch opening. To achieve a secure connection of catch hook and catch opening, at least one ramp is arranged on the first housing part, opposite the catch hook, which ramp rises in the insertion direction of the second housing. This means that the ramp rises in the direction in which the second housing part is moved toward the first housing part during assembly. This has the result that, during the assembly of the first housing part with the second housing part, the tab of the second housing part comes into contact with the ramp during the latching and is deflected by the ramp in the direction of the catch hook. The deflection of the tab results in the catch opening being deflected or pushed in the direction of the catch hook. The catch hook fully engages the catch opening and in there is the greatest possible contact surface between catch hook and catch opening. Because of the ramp, during the latching a maximal contact surface is always achieved between catch opening and catch hook, it can be ensured that during the deployment of the airbag the ensuing forces are distributed on as large a surface as possible. In this way stressing the catch hook can be reduced, so that a malfunction or tearing off of the catch hook can be avoided. In addition, the catch hook need not be unnecessarily long, i.e. jutting out transverse to the insertion direction, so that the deflection of the catch hook required during the insertion of the tab can be kept to a minimum.

DETAILED DESCRIPTION OF THE INVENTION

Figure 1A:
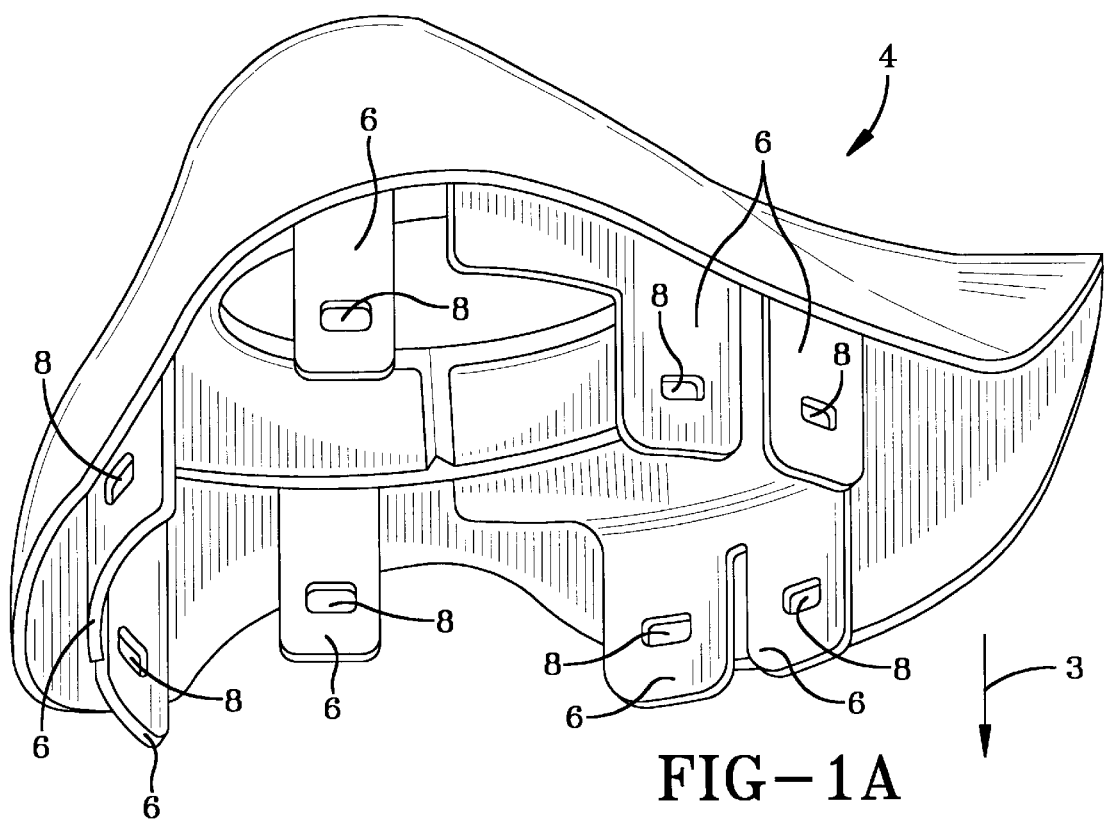
FIG. 1A is a perspective view of an airbag cover prior to assembly with the airbag housing shown in FIG. 1B.
Figure 1B:
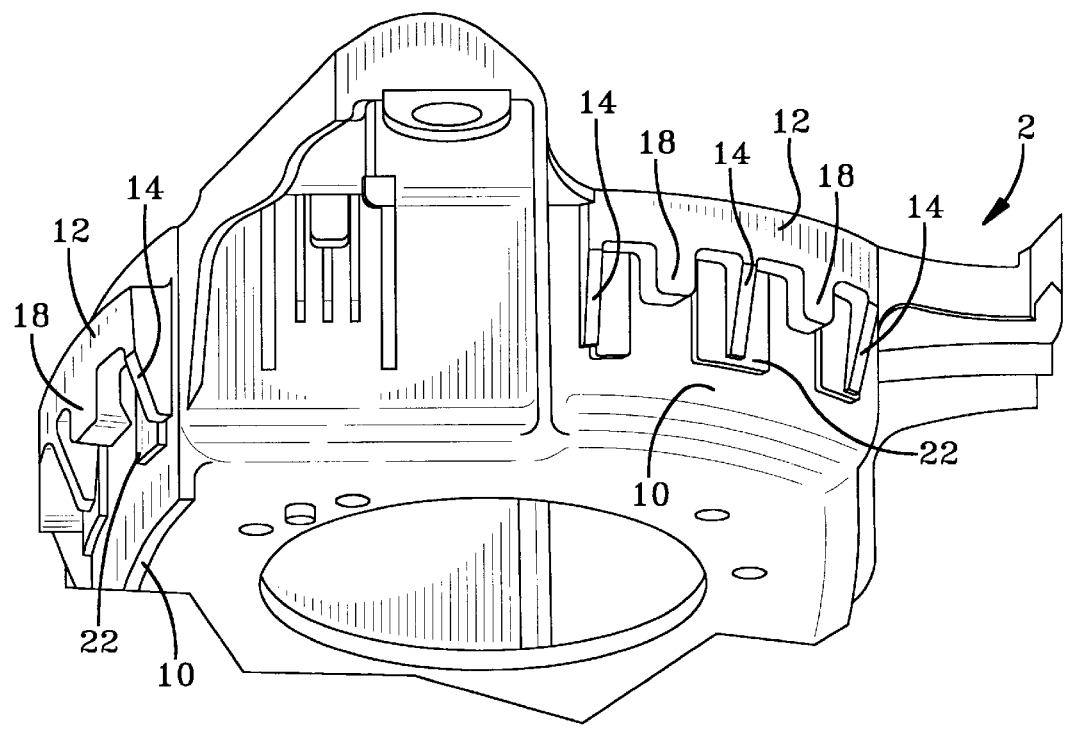
FIG. 1B is a perspective view of an airbag housing prior to assembly with the airbag cover shown in FIG. 1A.

FIGS. 1A and 1B are perspective views of two housing parts 2, 4 of an airbag module prior to their assembly with one another. It is preferred that the first and/or second housing parts are preferably in each case made in one piece out of synthetic material. This enables a very cost-effective production of both housing parts, since they can for instance be produced by injection molding, without there being a need for further assembly steps. One of the housing parts is an airbag cover and the other housing part an airbag housing. Large forces arise during the unfolding of the airbag, since initially the set breaking points provided in the airbag cover must tear, to ensure an ejection of the airbag. The tabs are preferably arranged on the airbag cover. During the assembly of the airbag cover with the airbag housing, the airbag cover is moved towards the airbag housing, whereby tabs with the catch hooks or catch openings engage the airbag housing. The tabs are in this case deflected by a ramp to create a secure connection between the airbag cover and the airbag housing.

As shown in FIG. 1B the first housing part 2 is an airbag housing, in which a folded or bundled up airbag and a gas generator are arranged. The first housing part is preferably pot-shaped. The airbag housing 2 is secured to a vehicle structure, for instance to a steering wheel. The second housing part 4 is an airbag cover, which covers the airbag module to the outside, i.e. towards the vehicle interior. In the assembly of the two housing parts with one another, the airbag cover 4 is moved towards the airbag housing 2 in the direction of the arrow 3 in FIG. 1A and latched with the airbag housing. The arrow 3 thus indicates the insertion direction of the airbag cover 4. On the airbag cover 4, in the insertion direction indicated by the arrow 3, projecting tabs 6 are arranged that each have a catch or engagement opening 8 therethrough.

The airbag housing 2 has an essentially cylindrical outer wall 10. Arcuate wall elements 12 are arranged essentially concentric to and radially outwardly distanced from the cylindrical outer wall 10. It is understood that the arcuate wall elements can be arranged radially inward or outward of the first housing part. The arcuate wall elements 12 are held at a distance from the cylindrical outer wall 10 of the airbag housing 2 by webs 14. In this case between the cylindrical outer wall 10 and the arcuate wall elements 12 between the individual webs 14 insertion slots 16, preferably arcuate slots, are created, in which the tabs 6 of the airbag cover 4 can engage. In the region of the insertion slots 16, catch hooks 18 extend from the arcuate wall elements 12 in the insertion direction indicated by the arrow 3. Each catch hook 18 has a catch hook projection 20 that extends transverse to the insertion direction indicated by the arrow 3 and pointing inwardly, i.e. to the cylindrical outer wall 10. During the insertion of the tabs 6 in the insertion slots 16, the catch hook projections 20 of the catch hooks 18 engage the catch openings 8 in the tabs 6. In addition, between the webs 14, i.e. in the region of the insertion slots 16 on the cylindrical outer wall 10 of the airbag housing 2, ramps 22 are arranged, which rise in the direction of the insertion direction indicated by the arrow 3. During the insertion of a tab 6 in an insertion slot 16, the ramps 22 deflect the tab 6 towards an arcuate wall element 12, i.e. essentially transverse to the insertion direction indicated by the arrow 3. In this case, the catch openings 8 are furthermore brought into engagement with the catch hook projections 20 of the catch hooks 18.

During the deployment of the airbag the forces between the airbag housing and the airbag cover thus act essentially also in the direction of the insertion direction. Due to this fact it is advantageous to design the force transmitting surfaces perpendicular to this direction, to create as great a force transmitting surface as possible and to enable a secure force transmission. Each catch hook projection 20 is a force transmitting member in the latched state between the two housing parts, i.e. preferably between the airbag housing and the airbag cover. Due to this fact, the size of the latch hook projection should be as great as possible in its perpendicular extension to the direction of action, to enable a secure force transmission. The force arising during the deployment of the airbag acts essentially according to the insertion direction during the latching of the two housing parts.

Figure 2:
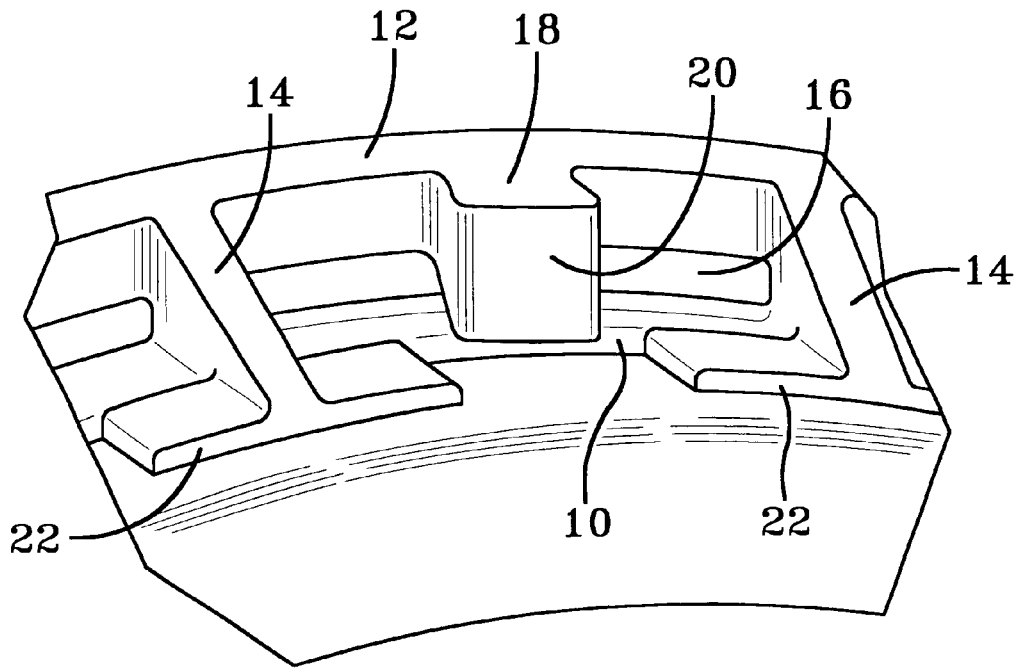
FIG. 2 is a magnified perspective view of a catch hook.
Figure 3:
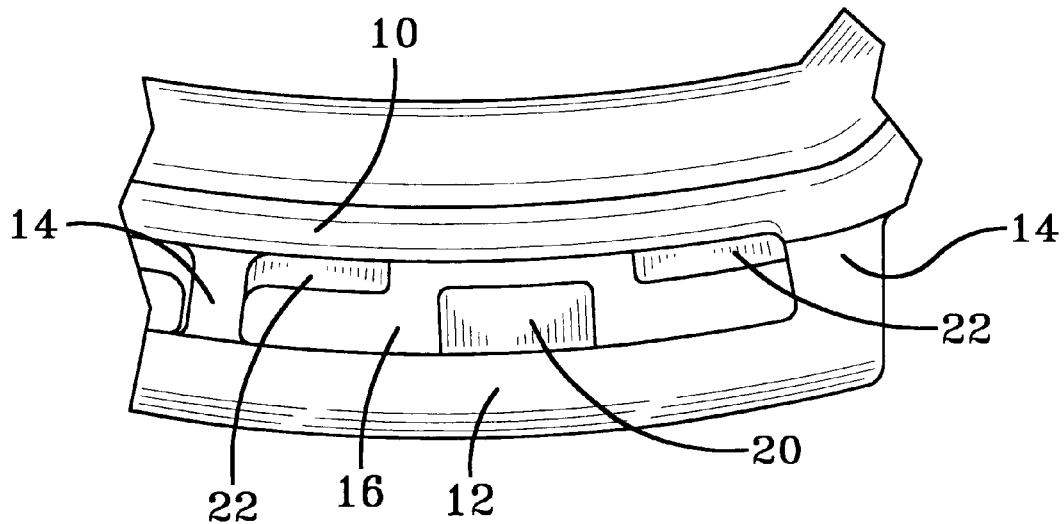
FIG. 3 is a magnified top view of a catch hook.
Figure 5:
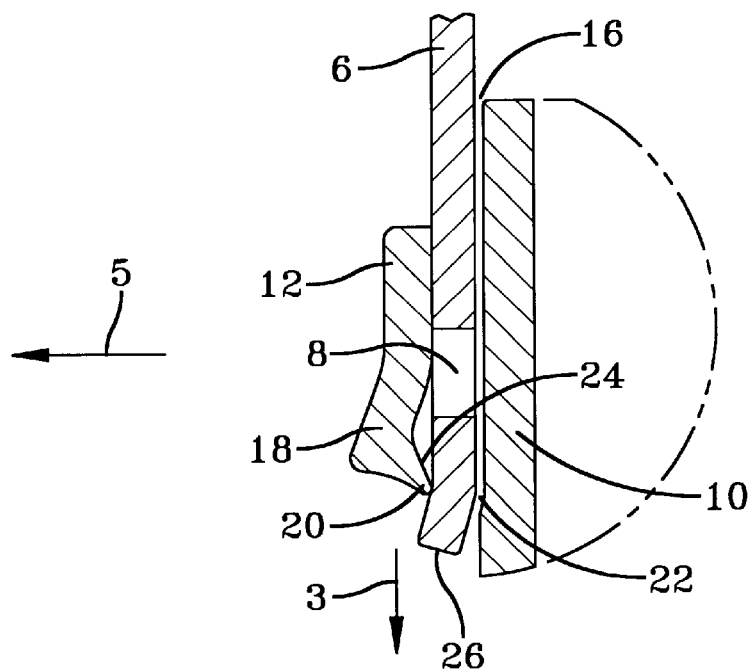
FIG. 5 is a cross sectional view of catch hook and catch opening the during latching process.
Figure 6:
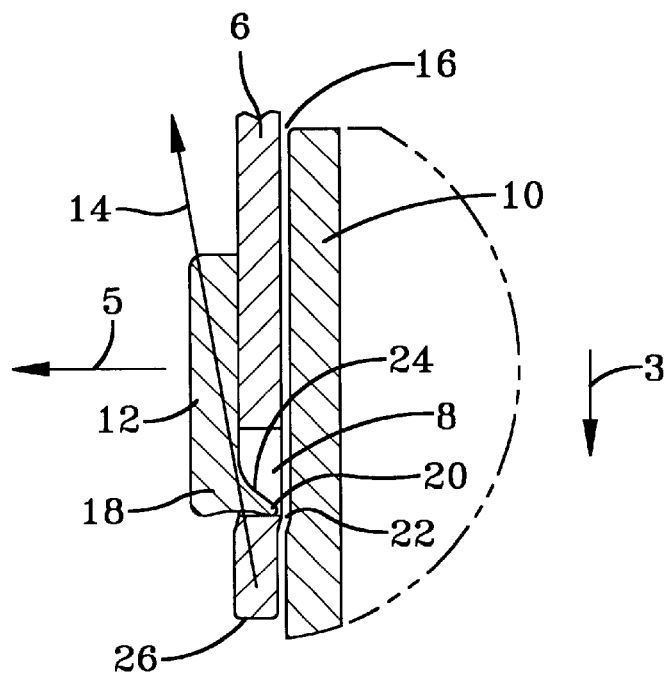
FIG. 6 is a cross sectional view of catch hook and catch opening in the latched state.

FIG. 2 is a magnified detailed view of an insertion slot 16 viewed in a direction, that is essentially opposite the insertion direction indicated by the arrow 3. The arcuate wall element 12 is held by the webs 14 at a distance from the cylindrical outer wall 10 of the airbag housing 2. An insertion slot 16, best shown in FIGS. 2 and 3, is located between the arcuate wall element 12 and the cylindrical outer wall 10. The distance between the arcuate wall element 12 and the cylindrical outer wall 10 preferably corresponds to essentially the thickness of the tabs 6, so that a tab 6 can be inserted into the insertion slot 16 without any problem. A catch hook 18 extends from the arcuate wall element 12. The catch hook projection 20 projects into the insertion slot 16. The catch hook projection 20 is in that case turned toward the cylindrical outer wall 10. On the cylindrical outer wall 10 facing the catch hook projection 20 ramps 22, best seen in FIGS. 5 and 6, are arranged in proximity of the webs 14. The ramps 22 rise in the insertion direction indicated by the arrow 3, i.e. the ramps 22 exhibit their greatest height or thickness at their front side situated in the insertion direction indicated by the arrow 3.

FIG. 3 is a magnified view of the insertion slot 16 viewed in a direction indicated by the arrow 3 in FIG. 1A. An insertion slot 16 is created between the cylindrical outer wall 10, the arcuate wall element 12 as well as between the webs 14. A catch hook projection 20 of a catch hook 18 projects into the insertion slot 16. The ramps 22 project from the cylindrical outer wall 10 in a direction opposite the catch hook projection 20. During the insertion of the cover 4, the ramps 22 can thus deflect the tabs 6 in the direction of the catch hook projection 20.

Figure 4:
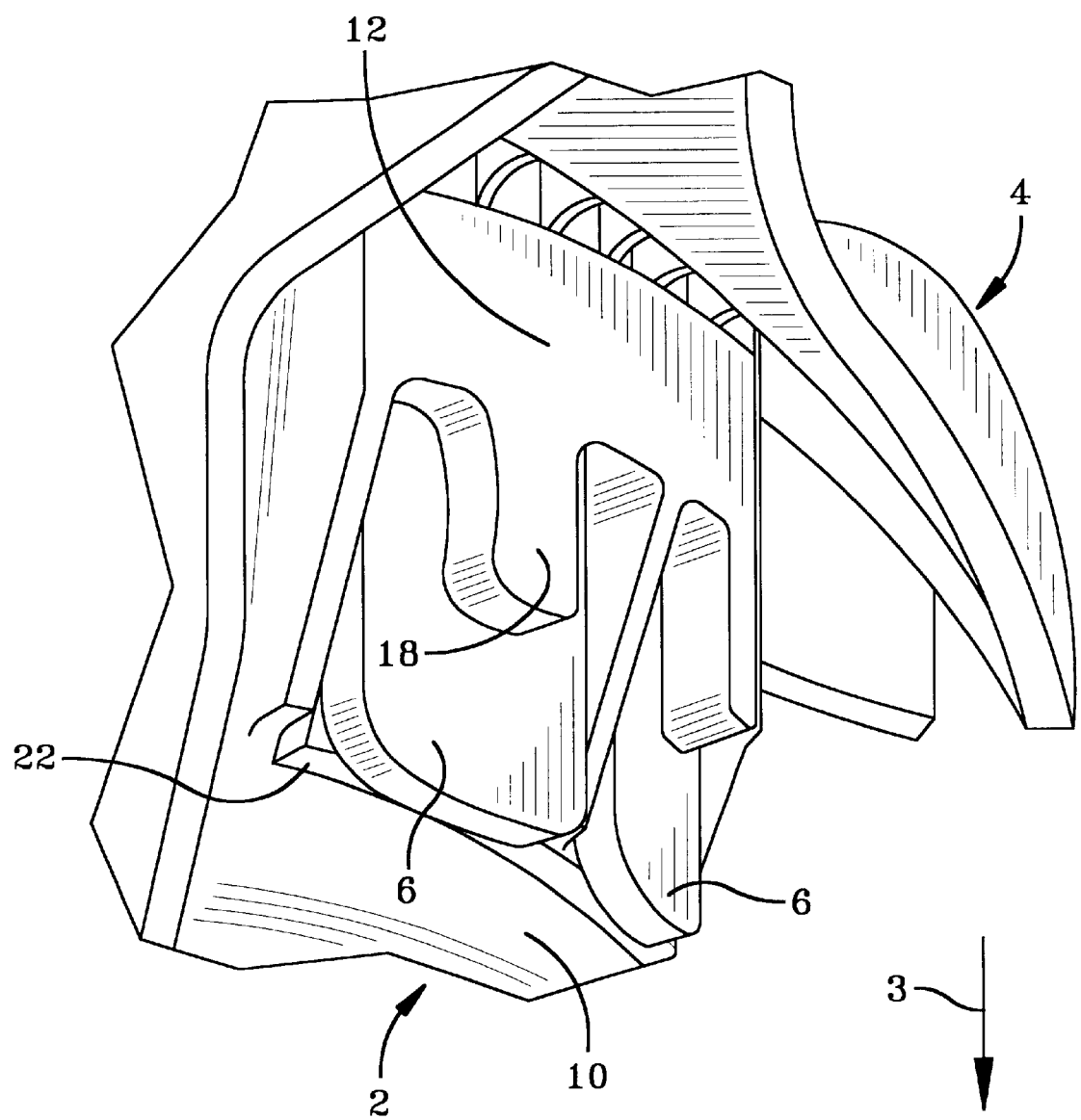
FIG. 4 is a cross sectional view of the airbag cover and of the airbag housing latched together.

FIG. 4 is a magnified view of only a portion of the airbag housing 2 with an inserted airbag cover 4. The tabs 6 are inserted in the corresponding insertion slots, i.e. they are situated between the arcuate wall element 12 and the cylindrical outer wall 10. The catch hook 18 in that case engages with its catch hook projection the catch opening in the tab 6. The ramp 22 thus deflects the tab 6 radially outwardly, i.e. away from the cylindrical outer wall 10. This results in the catch opening 8 completely engaging the catch hook projection of the catch hook 18, to enable a secure assembly. The front end of the tab 6 situated in the insertion direction indicated by the arrow 3 exhibits preferably rounded edges, to enable an easy insertion of the tab 6 in the insertion slot.

Preferably, the catch hooks 18 can be deflected in a resilient manner, essentially transverse to the insertion direction. This configuration enables the catch hooks to be initially swiveled perpendicularly to the insertion direction, until they can engage the catch openings. On the basis of the resilient deformation, the catch hooks, as soon as they have reached the catch openings during the insertion process, swivel into the latter. The catch hooks in this case preferably essentially adapt to a large extent stress-free original state. In this way a secure engagement of the catch hooks with the catch openings can be achieved.

FIG. 5 is a side cross-sectional view of the insertion slot 16 with an inserted tab 6 during the latching process. The tab 6 is not yet completely inserted in the insertion slot 16 and must still be further moved in the insertion direction indicated by the arrow 3 for complete latching. The catch hook projection 20 of the catch hook 18 extends opposite the insertion direction indicated by the arrow 3 and is pointing towards the cylindrical outer wall 10. During the insertion of the tab 6 in the insertion slot 16, the front end 26 of the tab situated in the insertion direction, indicated by the arrow 3, of the tab 6 initially comes into contact with the beveled surface 24 of the catch hook projection 20. With further movement of the tab 6 in the insertion direction indicated by the arrow 3, the catch hook 18 is deflected in a direction indicated by the arrow 5, i.e. transverse to the insertion direction indicated by the arrow 3. This enables the tab 6 to be moved into the insertion slot 16 in the insertion direction indicated by the arrow 3. Next the front end 26 of the tab 6 comes into contact with the ramp 22. The ramp 22 projects in front of the cylindrical outer wall 10 in a direction indicated by the arrow 5 and rises in the insertion direction indicated by the arrow 3. This results in the front end 26 of the tab 6 also being deflected towards the catch hook 18 in the direction indicated by the arrow 5. The ramp 22 is in this case arranged in the insertion direction essentially behind the catch hook projection 20 of the catch hook 18. This has the effect that initially the catch hook 18 is deflected in a direction indicated by the arrow 5, before the front end of the tab 6 is also deflected in this direction during insertion.

FIG. 6 is similar to FIG. 5; however in this figure the tab 6 is completely inserted in the insertion slot 16, i.e. in this state the airbag cover 4 and the airbag housing 2 are completely interlocked. In this state, the catch hook projection 20 of the catch hook 18 is located in the catch opening 8 of the tab 6. The catch hook 18 has resiliently reformed in the opposite direction indicated by the arrow 5, so that the catch hook projection 20 projects into the catch opening 8. At the same time the ramp 22 bends the front end 26 of the tab 6 in the direction indicated by the arrow 5. The front end 26 is thus pushed or deflected towards the catch hook 18. This deformation or deflection of the front end 26 of the tab 6 results in the front inner surface of the engagement opening 8, situated in the insertion direction indicated by the arrow 3, coming into as complete a contact as possible with the catch hook projection 20 of the catch hook 18. Due to this arrangement, a secure force transmission can be ensured, which can prevent a tearing off of the catch hook projection 20 when the airbag is deployed. The surface 24 extends essentially transverse to the insertion direction, i.e. parallel to the direction indicated by the arrow 5. In the latched state the catch hook 18 is preferably totally re-formed, so that it is essentially stress-free, such that a creeping of the material and a corresponding aging can be avoided.

Alternatively, the first housing part can also comprise at least one catch opening and the second housing part can comprise at least one tab with a corresponding catch hook. To this effect, on the first housing part, opposite the catch hook, at least one ramp is arranged, which rises in the insertion direction of the second housing, i.e. as described above, the ramp rises in the direction in which the second housing part is moved onto the first housing part during the assembly. In this way, during the assembly of the two housing parts, the tab with the catch hook is deflected to the catch opening, so that the catch hook is completely pushed into the catch opening. This configuration thus represents the opposite arrangement to the above-described configuration. This configuration also creates the greatest possible contact surface between catch opening and catch hook, to enable a secure force transmission with minimal stresses in the catch elements, i.e. catch hook and catch opening.

Alternatively, the catch openings can also be arranged in the arcuate wall elements. In this case, the catch hooks are arranged on the tabs that are to be inserted. During the insertion of the tabs, the arcuate wall element is initially deflected, i.e. away from the cylindrical outer wall, in a resilient manner, until the catch hooks engage the catch openings in the arcuate wall element. When the catch hooks have engaged the catch openings, the arcuate wall element is preferably in its original position, so that excessive stresses are avoided in the arcuate wall element.

The foregoing specification discloses and describes a preferred embodiment of the invention. One skilled in the art will readily recognize that changes and modification can be made to the invention without departing from the true spirit and fair scope of the invention as defined in the following claims.

We claim:

1. An airbag module comprising
    at least two housing parts securely connected to each other by a mechanical catch connection,
    at least one catch hook is arranged on a first housing part,
    at least one tab with a corresponding catch opening is arranged on the second housing part, and
    at least one ramp is arranged on the first housing part, opposite the catch hook, the at least out ramp rises in the insertion direction of the second housing part and during the insertion deflects the tab of the second housing part in the direction of the catch hook, wherein the first housing part comprises a cylindrical outer wall extending essentially parallel to the insertion direction and whereby, at a parallel distance to said cylindrical outer wall, an arcuate wall element is arranged so that between the cylindrical outer wall and the arcuate wall element a gap is created for receiving the tab of the second housing part.

2. The airbag module according to claim 1 wherein one of the at least two housing parts is an airbag cover and the other housing part is an airbag housing.

3. The airbag module according to claim 1 wherein the catch hook is beveled at front side situated in the insertion direction.

4. The airbag module according to claim 1 wherein the catch hook has a catch hook projection that extends essentially perpendicularly to the insertion direction.

5. The airbag module according to claim 1 wherein at least the rear inner surface of the catch opening situated in the insertion direction extends essentially perpendicularly to the insertion direction.

6. The airbag module according to claim 1 wherein the catch hook is arranged on the arcuate wall element.

7. The airbag module according claim 1 wherein the catch hook can be deflected in a resilient manner, essentially transverse to the insertion direction.

8. The airbag module according to claim 1 wherein the tab can be resiliently deflected, essentially transverse to the insertion direction.

9. An airbag module comprising
    at least two housing parts securely connected to each other by a mechanical catch connection,
    at least one catch opening is arranged on a first housing part,
    at least one tab with a corresponding catch hook is arranged on a second housing part, and
    a ramp is arranged on the first housing part, opposite the catch opening, the ramp rises in the insertion direction of the second housing and during the insertion deflects the tab of the second housing part in the direction of the catch opening wherein the first housing part comprises a cylindrical outer wall extending essentially parallel to the insertion direction and whereby, at a parallel distance to said cylindrical outer wall, an arcuate wall element is arranged so that between the cylindrical outer wall and the arcuate wall element a gap is created for receiving the tab of the second housing part.

10. The airbag module according to claim 9 wherein one of the at least two housing parts is an airbag cover and the other housing part is an airbag housing.

11. The airbag module according to claim 9 wherein the catch hook is beveled at a front side situated in the insertion direction.

12. The airbag module according to claim 9 wherein the catch hook has a catch hook projection that extends essentially perpendicularly to the insertion direction.

13. The airbag module according to claim 9 wherein at least the rear inner surface of the catch opening situated in the insertion direction extends essentially perpendicularly to the insertion direction.

14. The airbag module according to claim 9 wherein the catch hook is arranged on the arcuate wall element.

15. The airbag module according claim 9 wherein the catch hook can be deflected in a resilient manner, essentially transverse to the insertion direction.

16. The airbag module according to claim 9 wherein the tab can be resiliently deflected, essentially transverse to the insertion direction.

* * * * *